United States Patent [19]

Hoskin et al.

[11] Patent Number: 4,735,265

[45] Date of Patent: Apr. 5, 1988

[54] METHOD OF ENHANCED OIL RECOVERY FROM SUBTERRANEAN FORMATIONS

[75] Inventors: Dennis H. Hoskin, Lawrenceville; Thomas O. Mitchell, Pennington, both of N.J.

[73] Assignee: Mobil Oil Corporation, New York, N.Y.

[21] Appl. No.: 46,606

[22] Filed: May 7, 1987

[51] Int. Cl.$^4$ .......................................... E21B 33/138
[52] U.S. Cl. ..................................... 166/294; 166/270
[58] Field of Search ................. 166/294, 295, 270, 300

[56] References Cited

U.S. PATENT DOCUMENTS

| | | | |
|---|---|---|---|
| 3,757,863 | 9/1973 | Clampitt et al. | 166/270 X |
| 3,762,476 | 10/1973 | Gall | 166/294 |
| 3,833,061 | 9/1974 | Gall | 166/294 |
| 3,981,363 | 9/1976 | Gall | 166/270 |
| 4,009,755 | 3/1977 | Sandiford | 166/270 |
| 4,011,910 | 3/1977 | Rhudy et al. | 166/274 |
| 4,069,869 | 1/1978 | Sandiford | 166/270 |
| 4,081,029 | 3/1978 | Holm | 166/270 |
| 4,417,623 | 11/1983 | Anthony | 166/294 |
| 4,498,539 | 2/1985 | Bruning | 166/294 |
| 4,660,640 | 4/1987 | Hoskin et al. | 166/270 |
| 4,679,625 | 7/1987 | Gibbons | 166/270 |

*Primary Examiner*—Stephen J. Novosad

*Attorney, Agent, or Firm*—Alexander J. McKillop; Michael G. Gilman; Charles J. Speciale

[57] ABSTRACT

A method of enhancing the amount of oil recovered from a subterranean oil-bearing formation by controlling the profile of the formation by introducing a predetermined first amount of a permeability control agent in a non-gelatinous state into the formation so that it contacts at least a portion of the formation. A portion of the pores of the formation are plugged by allowing contact to be maintained for a sufficient period of time allowing the first portion to gel. The first amount constitutes a portion of the total amount required to improve the profile of the formation. A predetermined second amount of permeability control agent is thereafter introduced, in a non-gelatinous state, into the formation which contacts the first amount and the portion of the formation not contacted by the first amount for a time period sufficient to gelatinize the second amount so as to plug the remaining unproductive pores of the formation. The second amount constitutes the remaining portion of the total amount required to improve the profile of the formation. Complete profile control is attained while not requiring any greater quantities of permeability control agent than those typically required in a single step profile control treatment.

21 Claims, No Drawings

METHOD OF ENHANCED OIL RECOVERY FROM SUBTERRANEAN FORMATIONS

FIELD OF THE INVENTION

The present invention relates generally to subterranean oil-bearing formations and, more particularly, to a method for controlling the permeability in subterranean oil-bearing stratified reservoirs to improve oil recovery therefrom.

BACKGROUND OF THE INVENTION

In the recovery of oil from subterranean oil-containing reservoirs, various flooding techniques have been employed, the most common being waterflooding. However, such techniques are rapidly becoming impractical from the perspective of cost and efficiency. Many oil wells will produce a gross product effluent comprising 80-98 percent by volume of water, and hence, only 2-20 percent by volume of oil. As will be easily recognized, most of the pumping energy is expended in lifting water from the well, requiring the production effluent to undergo expensive separation procedures to recover water-free hydrocarbons. In addition, the residual foul water constitutes a troublesome and expensive disposal problem.

The inordinate amount of water present in these subterranean reservoirs can occur from the infiltration of naturally occurring subterranean water or from injected water. The excessively high water content effluent is primarily due to the fact that different strata or zones in the reservoir often vary in permeability, so that displacing fluids, or "drive" fluids, enter the high permeable or "thief" zones in preference to zones of lower permeability where significant quantities of hydrocarbons may be left.

Thus, in order to maximize the hydrocarbon content and minimize the water content of the production effluent resulting from waterflooding, and to maximize the volumetric sweep efficiency of the driving fluid, the desirability of designing a viscous slug capable of sealing off the more permeable or thief zones so that the floodwater would be diverted to the underswept, tighter regions of the reservoir becomes evident. The more preferred viscous slugs of this nature, typically labeled "profile control agents", have included oil/water emulsions, gels and polymers, with polymers being the most extensively applied in recent years.

Proposals have been made for the use of inorganic polymers, especially inorganic silicates, as permeability control agents. For example, U.S. Pat. Nos. 4,009,755 and 4,069,869 disclose the use of inorganic silicates for this purpose. In the permeability control method described in these patents, an organic polymeric permeability control agent such as a cross-linked polyacrylamide or polysaccharide is first injected into the reservoir, followed by an aqueous solution of an alkaline metal silicate and a material that reacts with the silicate to form a silicate gel which plugs the high permeability regions in the formation. An alkaline metal silicate is typically used as the source of silica and the gelling agent is usually an acid or acid forming compound such as a water soluble ammonium salt, a lower aldehyde, an aluminum salt or an alkaline metal aluminate.

The problem, however, with many inorganic silicates is that their solutions are often quite viscous and stable only under alkaline conditions. As soon as conditions become acidic, a silicate gel is formed. Although this is the desired reaction for plugging the formation, it may occur prematurely, i.e., before the solution has had an adequate opportunity to enter the high permeability regions of the formation, cutting off the possibilities for further injection of plugging material.

Other attempts have been made to achieve profile control. One such attempt is described in U.S. Pat. No. 4,498,539 to Bruning, which discloses delayed gelable compositions for injection of a water thickening amount of a polymer capable of gelling in the presence of a cross-linking agent so that after the composition has penetrated into an underground formation and positioned itself preferentially in the highly permeable strata, the delayed gelation is triggered by in situ hydrolysis of an ester which reduces the pH of the composition to the gelable range thereby producing in-depth plugging of the strata with the gelled polymer.

U.S. Pat. No. 4,417,623 to Anthony describes a method for consolidating sand with organic silicate wherein unconsolidated sand-like material in a subsurface formation adjacent a borehole of a water, oil, or gas well is consolidated by treating the formation first with a solution of alcohol and organic silicate and then with water. The water causes the organic silicate to hydrolyze and polymerize into a coating-like binding agent. The water also flushes excess organic silicate-alcohol solution from the more permeable portions of the formation adjacent the borehole, thereby maintaining the formation's permeability.

U.S. Pat. No. 4,081,029 to Holm discloses a method for enhancing oil recovery from subterranean reservoirs which includes injection of a relatively large slug of a dilute aqueous alkali metal silicate solution followed optionally by an aqueous drive fluid, again followed by a small slug of a dilute aqueous solution of an agent that reacts with the alkali metal silicate to form a gelatinous precipitate.

U.S. Pat. No. 4,011,910 to Rhudy et al. discloses mobility control in secondary type oil recovery through injection of two aqueous polymer solutions. The polymer of the first solution has an average molecular weight of at least 10 million while the second polymer solution contains a polymer which does not substantially change rock permeability, but imparts a viscosity increase to the solution. An example of the polymers used in the first solution is high molecular weight polyacrylamide while the second solution can contain a biopolymer such as a polysaccharide.

U.S. Pat. No. 3,981,363 to Gall discloses a method for obtaining good residual resistance factor at relatively low ratios of cross-linking agents to polymer for plugging fractured porous media by injecting into the formation a first aqueous polymer solution followed by injecting a cross-linking agent capable of gelling the polymer solution and thereafter injecting a second aqueous polymer solution that is capable of being gelled by the cross-linking agent. In each of the aqueous polymer solutions the polymer is already partially cross-linked before the polymer solution is injected into the formation. Furthermore, each of the injections of polymer solution are whole-slug injections.

U.S. Pat. No. 3,833,061 to Gall discloses a method for selectively reducing the permeability of an oil-wet subterranean formation by passing an oxidizing agent through and in contact with the formation for oxidizing and removing hydrocarbon from the surfaces of the formation and thereafter contacting the treated formation surfaces with a cross-linked polymer for selectively reducing the permeability of the formation to brine while maintaining the permeability of the formation to hydrocarbon fluids relatively unchanged.

U.S. Pat. No. 3,762,476 to Gall discloses a method for correcting water permeability of a well bore-penetrated subterranean formation by injecting a first aqueous polymer solution, a complexing ionic solution, a brine slug, a second aqueous polymer solution, terminating the injection of the second aqueous solution, and recovering the hydrocarbon fluids from the subterranean formation.

U.S. Pat. No. 3,757,863 to Clampitt et al. discloses a method for reducing the quantity of water recovered from a subterranean formation by treating the formation with an acid, a neutralizing brine, and at least one slug of thickened aqueous solutions.

While these patents disclose methods for achieving profile control to a limited extent, each of them suffer disadvantages which detract from the efficiency and quality of secondary oil recovery.

Accordingly, it is an object of the present invention to provide a method of attaining improved profile control of subterranean oil-bearing strata or stratified reservoirs.

It is another object of the present invention to provide such a method which maximizes the oil content and minimizes the water content of production effluent resulting from waterflooding oil-recovery operations of subterranean formations.

It is another object of the invention to maximize invasion of hydrocarbon containing regions of the formation by the driving fluid.

It is a further object of the present invention to make practical, waterflooding oil-recovery operations, from the perspective of cost and efficiency.

SUMMARY OF THE INVENTION

In order to accomplish the foregoing objects the present invention provides a method of enhancing the amount of oil recovered from a subterranean oil-bearing formation by controlling the profile thereof by a method which includes introducing a predetermined first amount of a permeability control agent in a non-gelatinous state, as defined in the description, into the formation in contacting relation with at least a portion of the formation. The first amount is a portion of a total amount required to improve the profile of the formation. The first amount is gelled in the formation and plugs at least a portion of the pores in the formation.

Thereafter, a predetermined second amount of the permeability control agent is introduced, in a non-gelatinous state, into the formation in contacting relation with the first amount and the portion of said formation not contacted by the first amount in a manner and for a time sufficient to gelatinize the second amount. The second amount is the remaining portion required to improve the profile of the formation thereby effectuating control of the profile of the formation.

In accordance with the present invention, when a given effective dose of a permeability control agent is separated into at least two various predetermined amounts and is introduced sequentially as described previously into a subterranean oil-bearing formation, improved profile control is achieved. Each subsequent amount added is introduced into the formation after the previously introduced amount is permitted to gelatinize.

Because of the thermal stability and stability in a brine environment, alkyl polysilicates and preferably ethyl polysilicate has been discovered to be a highly effective permeability control agent for controlling the profile of a subterranean stratum or stratified formation.

Notwithstanding this however, when other permeability control agents, such as xantham gum, are employed in accordance with the present invention improved profile control is also attained.

Thus, the present invention provides improved profile control while not requiring any dosages of permeability control agent which would exceed those dosages employed in a single step treatment of the prior art.

DESCRIPTION OF THE PREFERRED EMBODIMENT

The method for the control of permeability in subterranean, oil-bearing formations according to the present invention can be used in conjunction with flooding operations in which a flooding liquid, usually water, is injected into the formation through injection wells which extend from the surface of the earth into the formation. As is known, the flooding or drive liquid displaces the oil from the formation towards a production well which is situated at a horizontal distance or offset from the injection well. In practice, a number of injection and production wells will be used in a given field, arranged in conventional patterns such as a line drive, five spot or inverted five spot, seven spot or inverted seven spot.

Since the flooding liquid will tend to pass preferentially through the high permeability regions and leave the low permeability or "tight" zones unswept, it is desirable to plug the high permeability regions. This can be accomplished by injecting a permeability control agent through the injection well in a slug, to form a plug in the high permeability regions.

The permeability control agent forms a gel-like precipitate or plug in the formation and this diverts the flooding liquid to the tight zones, to displace the oil from them. The plug should, of course, have adequate stability, both in terms of mechanical strength, since it is necessary for the plug to resist the pressures which will be applied during the subsequent flooding step by the injection of the flood liquid, and chemical stability under the reservoir conditions which are encountered, such as high temperature and salinity conditions.

A variety of known permeability control agents, such as xantham gum, when employed in accordance with the present invention, offer better profile control than they otherwise would if employed in a conventional manner.

The preferred permeability control agents employed in accordance with the present invention are polysilicate esters, preferably of organic alcohols. More preferably, the permeability control agents are alkyl polysilicates. By way of illustration, the alkyl polysilicates can be made by acidifying sodium silicate to form polysilicic acid, which is thereafter esterified by an organic alcohol, such as 1-butanol or 2-(2-methoxyethoxy)-ethanol. Because of its hydrolytic stability, especially at high temperatures, the most preferred permeability control agent is ethyl polysilicate, which can be formed in any conventional manner, such as by the partial hydrolysis of tetra-ethylorthosilicate.

The polysilicate esters can be formed from simple alcohols such as methyl, ethyl, n-propyl, iso-propyl, n-butyl, sec-butyl and tert-butyl alcohol. They can also be formed from polyols such as ethylene glycol, 1,2-propylene glycol, 1,3-propylene glycol; or higher glycols and higher polyols such as glycerol. Polymeric alcohols can also be used to form the esters, such as for example polyvinyl alcohol and polymeric alkylene oxides with terminal hydroxyl groups. Other organic compounds which contain functional hydroxol groups can also be employed, for example, alkanolamines such as monoethanolamine, diethanolamine and triethanolamine and the partial ethers and esters of glycols and higher polyols, for example, alkanoletherates such as the monoalkylethers of ethylene glycol, e.g. ethylene glycol monomethyl ether, ethylene glycol monoethyl ether, ethylene glycol monobutyl ether, ethylene glycol monohexyl ether and ethylene glycol monophenyl ether, which are commercially available under the "Cellosolve" trademark.

The polysilicate esters can be produced by reacting the selected hydroxyl group-containing compound with an acidified solution of an alkali metal silicate, usually sodium silicate. Solutions of this kind are regarded as solutions of polysilicic acid, the degree of polymerization depending upon the composition of the original silicate solution and the acidification conditions employed, particularly the rate of acidification. The alkali metal silicates are used in the form of aqueous solutions of the silicate, commonly available as "water glass". These solutions may be of varying composition, depending upon the $Na_2O:SiO_2$ ratio of the silicate. Generally, this ratio will vary within the range of about 2:1 to 1:3.75 (molar, as oxide), determined by the ratio of soda ash to silica used in the production of the silicate. For present purposes, it is generally preferred to use silicates which form less viscous aqueous solutions since it has been found that these will produce esters which are more readily injected into the formation but which still retain adequate gel strength once correct placement within the high permeability regions of the formations have been achieved.

The solution of the alkaline metal silicate is acidified using an acid or an acid-forming reagent such as sulfuric acid, hydrochloric acid, nitric acid, ammonium sulfate or aluminum sulfate. Acidification is generally carried out under ambient conditions or with cooling, and with vigorous stirring to prevent the formation of a solid silica gel. Generally, the acidification will be carried out at pH values of 4.0 or lower, more usually 3.0 or lower. This will form a viscous solution which is then reacted with the desired alcohol to form the appropriate ester. Generally, reaction with the alcohol takes place readily under ambient conditions, although mild heating may be necessary in certain cases.

Hydrophobic polysilicate esters are preferred over their water soluble analogues primarily due to greater thermal stability and brine tolerance permitting them to gel at a lower rate.

The permeability reducing agents, when used in accordance with the present invention, are employed most advantageously in high temperature petroleum reservoirs, which are too hot (i.e., 70°-80° C.) for xanthan gum gels, because of their thermal stability.

A conventional use of a polymer gel (i.e., a cross-linked polymer) or a polymeric gel precursor plus cross-linking agent for profile control in enhanced oil recovery typically involves a single injection where the entire polymer gel or gel precursor plus cross-linker are injected all at once.

The present invention provides an improved profile control procedure producing results which are superior to the conventional single profile control treatment. Thus, in accordance with the present invention, a first portion of a polymer (gel precursor), is injected with a cross-linking agent into the subterranean formation in any conventional manner so that gelation occurs in situ. Alternatively, a cross-linked polymer (gel) can be injected into the formation, which gel can "shear thin" as a result of the shear forces which occur in pumps, well bore and in the formation at the locus of the well. Thus, even when cross-linked, the gel is non-gelatinous when introduced into the formation. When the injection of the gel has subsided the sheared gel "heals" as new cross-links form and the gel becomes immobile. A period of time, which will be discussed later in further detail, must elapse before the sheared gel will become completely healed.

The combination of polymer or polymer gel precursor and cross-linking agent contain all of the components necessary for gel formation under reservoir conditions. The amount of the first portion to be injected, whether in the form of a gel or polymer gel precursor plus cross-linking agent, is determined by first determining how much of the thief zone can be economically treated. This estimated percentage is then separated into at least 2 different portions, e.g., a first portion and a second portion, the sum of which will total the estimated percentage. These percentage portions can be translated into pore volume percentages thereby providing the dosages required for injection.

Thus, assuming hypothetically that it is estimated that 40% of the thief zone can economically be treated, then the first portion should be between a 10-30% pore volume treating mixture of permeability control agent, and preferably, the first portion will be a 20% pore volume treating mixture. Once the first portion is injected into the formation a time period is permitted to elapse so that the permeability reducing agent, in one embodiment, is permitted to heal or, in another embodiment, until cross-linking is permitted to occur in situ.

Where cross-linking occurs in situ, the particular time period for gelation normally is from about 4 hours to about 2 days. In the case where cross-linked material is added, healing takes place in about 4 hours to about 2 days. After the first portion has gelled to a sufficient strength as predetermined by laboratory experiment, a second portion is injected into the formation.

The second portion comprises a pore volume injection which can be calculated by the following formula:

$$PV_2 = E - PV$$

wherein E is the estimated value of the percentage of the thief zone that can be economically treated, $PV_1$ equals the pore volume of the first portion and $PV_2$ is the pore volume of the second portion.

It has been discovered that profile control is improved when the permeability control agent of the present invention is injected in two separate phases or portions, as opposed to the total amount (E) being injected all at once.

While the present description involves injection of permeability control agent in sequences, it is to be understood that the total amount (E) can be injected in more than two increments. Each of the individual injections are capable of placing gel in the formation by itself. Thus, there is no chemical reaction between the various incremental injections, nor does the first portion injected establish any type of salinity, rock property (e.g., wettability), pH or viscosity required for any subsequent injection. Furthermore, there are no further other steps which need be taken between incremental injections, such as the injection of fluid.

Accordingly, improved results are attained by multi-staged injections of the aforedescribed permeability reducing agents at pore volumes less than or equal to those known in the single injections techniques of the prior art.

It is believed that the improved profile control of the present invention is achieved from a change in available flow paths between the various incremental stages of injection, which does not occur with single injection of the same volume (E). Thus, the first portion injected will assume a certain flow path which typically occurs through the watered out regions in the more permeable zones. However, not all of the brine present therein becomes displaced and, as such, a mobile water pathway remains after the first portion gels. Although the remaining pathway is smaller and has a lower permeability to water, because of the lower mobil water saturation, at least some of the subsequently resumed floodwater will assume this route and profile control will be incomplete. However, when another portion of permeability control agent is injected into the formation as described, it assumes the route of the remaining water pathway and seals the pathway after gelation to complete the profile control. It can be seen that this procedure is more effective than simply using more material in the first injection. This is due to the fact that, otherwise, additional material would continue to follow the pathway established by the initial material.

The immediately preceding description is more apropos to a single reservoir stratum. However, the present invention also applies to a stratified reservoir system. In a stratified reservoir, in which several strata have been watered out but oil remains in less permeable strata, a single stage treatment serves to plug only the most permeable watered out stratum and renewed waterflooding does not effectively enter the unflooded strata. In such cases, the first stage of a multi-stage treatment reduces flow in the most permeable of the watered out strata and the second stage or subsequent stages would reduce flow in the next most permeable watered out stratum or strata.

Advantageous results are also observed which are attributable to the hydrophobicity of the alkyl polysilicates described above, particularly ethyl polysilicate. The initial injection leaves a considerable brine saturation. This apparently remains continuous after healing or gelation. The second treatment with permeability control agent disrupts the brine phase by breaking the brine continuum and causes complete plugging of the pores.

In a most preferred embodiment, ethyl polysilicate is delivered (i.e., injected) in a water medium. This insures travel through the same path through which the water had bypassed the reservoir oils. Thus, this oft-traveled route through the more permeable zones will have these profiles controlled by the ethyl polysilicate.

The improved profile control attained in accordance with the present invention are exemplified by the following examples.

EXAMPLES 1–4

Examples 1–4 tested the profile control of 40–325 mesh Berea sandstone packed in 2 ft. long and 0.37 inch diameter stainless steel columns using ethyl polysilicate (EPS) as a permeability control agent. These experiments were conducted at a temperature of 90° C. The fluid content in the columns prior to EPS injection was a 22% $NaCl/CaCl_2/MgCl_2$ brine, the three components being in the same proportions as in a West Burkburnett brine (WBB). The initial column permeability was 3–5 darcies. In each of the sandpacks a 1 pore volume dosage of ethyl polysilicate was injected. Each were shut in the sandpacks for selected periods (TABLE I). Thereafter, a brine was injected into each sandpack at a rate of 12 ft./day while monitoring pressure to detect plugging. In sandpacks 2, 3 and 4, after 6 pore volumes of brine were injected, a second EPS slug of ½ pore volumes was injected and shut in for an additional period of 24 hours. The results of experiments 1–4 appear in TABLE I.

TABLE I

| Sandpack | PV (ml) | $K_b$ (md) | EPS injected (ml) | Shut in (hrs) | Pressure Drop (psi) |
|---|---|---|---|---|---|
| 1 | 18.9 | 5140 | 22 | 16 | 1.7 |
| 2* | 19.1 | 5060 | 20/8 | 64/24 | 1/>30 |
| 3* | 17.0 | 3150 | 18/6 | 312/24 | 7/>30 |
| 4* | 19.2 | 5110 | 10/6 | 24/24 | 1/>30 |

*Double entries indicate first and second treatments.

As these data indicate, a single injection of EPS with shut in times of 16 hours, 64 hours and 24 hours (sandpacks 1, 2 and 4 respectively) did not effectuate any plugging as determined by insignificant pressure drops. In sandpack 3, a shut in time of 312 hours only effectuated slight plugging. However, when a second dosage of EPS was injected into sandpacks 2, 3 and 4 at a permitted shut in time of 24 hours, a significant drop in pressure, i.e., one which exceeds 30 psi, indicated that a complete degree of plugging had occurred.

EXAMPLES 5 AND 6

Two brine filled (5% NaCl, ½% $Ca^{++}$) 5200 md sandpacks (5 and 6) were injected with xantham gum (2000 ppm)/$Cr^{+++}$ (80 ppm) gel, at ambient temperature in the same brine. Into sandpack 5, a 0.15 pore volume dosage of the aforedescribed gel was injected at a rate of 5.95 ml/hr. or 3.6 ft./day. The sandpack was shut in for a 24 hour period and then another 0.15 pore volume dosage of the same gel was injected and shut in again for another 24 hour period After the second 24 hour shut in period had elapsed, a brine solution was injected into sandpack 5 at a rate of 5.95 ml/hr. The pressure drop across the 2 ft. sandpacks leveled off at 13.5 psi.

Into sandpack 6, a 0.30 pore volume dosage of the identical gel used in sandpack 5 was injected at a rate of 5.93 ml/hr. or 3.6 ft./day and then was shut in for 24 hours. After the shut in period had elapsed, a brine was injected. The pressure drop across the 2 foot sandpack was 8.1 psi.

Examples 5 and 6 demonstrate that the sandpack subjected to seriation injections of profile control agent was significantly better plugged than the sandpack subjected to a single injection even though identical pore volume dosages (0.30 PV) were employed in both instances, the former being subject to the sequential treatment of the present invention.

Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

We claim:

1. A method of enhancing the amount of oil recovered from a subterranean oil-bearing formation by controlling the profile thereof which comprises:

introducing a predetermined first amount of a permeability control agent in a non-gelatinous state into said formation in contacting relation with at least a portion of said formation, said first amount being a portion of a total amount required to improve the profile of said formation, gelling said first amount in said formation thereby plugging at least a portion of the pores in said formation; and thereafter introducing a predetermined second amount of permeability control agent in a non-gelatinous state into said formation in contacting relation with said first amount and the portion of said formation not contacted by said first amount in a manner and for a time sufficient to gelatinize said second amount, said second amount being the remaining portion required to improve the profile of said formation thereby effectuating control of the profile of said formation.

2. The method according to claim 1, wherein said first amount is between 10–30% of said total amount of thief zone pore volume.

3. The method according to claim 1, wherein said first amount is 20% of said total amount of said pore volume.

4. The method according to claim 1, wherein said permeability control agent includes xantham gum and polysilicate esters.

5. The method according to claim 1, wherein said polysilicate ester is an alkyl polysilicate.

6. The method according to claim 1, wherein said polysilicate ester is ethyl polysilicate.

7. The method according to claim 1, wherein the organic polysilicate ester is an ester of an alcohol.

8. The method according to claim 1, wherein the organic polysilicate ester is an ester of an organic polyol.

9. The method according to claim 1, wherein the organic polysilicate ester is an ester of a glycol.

10. The method according to claim 1, wherein the polysilicate is produced by the reaction of a hydroxyl group containing organic compound with the product obtained by acidifying an alkali metal silicate.

11. The method according to claim 1, wherein said predetermined first amount comprises a gel precursor and a cross-linking agent so that, after introduction into said formation, said gelation occurs in situ.

12. The method according to claim 1, wherein said predetermined second amount comprises a gel precursor and a cross-linking agent so that, after introduction into said formation, said gelation occurs in situ.

13. The method according to claim 1, wherein said predetermined first amount comprises a cross-linked gel that shear thins prior to introduction into said reservoir, and after said introduction, heals within said formation.

14. The method according to claim 1, wherein said predetermined second amount comprises a cross-linked gel that shear thins prior to introduction into said reservoir, and after said introduction, heals within said formation.

15. The method according to claim 11, wherein said gelation occurs after a time period of from about 4 hours to about 2 days.

16. The method according to claim 12, wherein said gelation occurs after a time period of from about 4 hours to about 2 days.

17. The method according to claim 13, wherein said healing within said formation occurs after a time period of from about 4 hours to about 2 days.

18. The method according to claim 14, wherein said healing within said formation occurs after a time period of from about 4 hours to about 2 days.

19. The method according to claim 1, wherein said subterranean oil bearing formation comprises a single stratum.

20. The method according to claim 1, wherein said subterranean oil-bearing formation comprises a stratified reservoir.

21. The method according to claim 1, wherein said portion contacted by said first amount includes a portion of higher permeability relative to the portion contacted by said second amount.

* * * * *